(12) United States Patent
Nollet

(10) Patent No.: US 8,268,465 B2
(45) Date of Patent: Sep. 18, 2012

(54) BATTERY, ELECTRICAL EQUIPMENT, AND A POWERING METHOD IMPLEMENTING MEANS FOR SHORT-CIRCUITING THE BATTERY

(75) Inventor: Michel Nollet, Noisy le Roi (FR)

(73) Assignee: Sagem Defense Securite, Paris (FR)

( * ) Notice: Subject to any disclaimer, the term of this patent is extended or adjusted under 35 U.S.C. 154(b) by 937 days.

(21) Appl. No.: 11/642,631

(22) Filed: Dec. 21, 2006

(65) Prior Publication Data

US 2007/0160900 A1 Jul. 12, 2007

(30) Foreign Application Priority Data

Dec. 22, 2005 (FR) ..................................... 05 13200

(51) Int. Cl.
*H01M 10/44* (2006.01)
(52) U.S. Cl. .......................................... 429/50
(58) Field of Classification Search .................. None
See application file for complete search history.

(56) References Cited

U.S. PATENT DOCUMENTS

| | | | |
|---|---|---|---|
| 5,789,092 A * | 8/1998 | Spiers et al. ................... | 429/24 |
| 6,340,879 B1 | 1/2002 | Bläcker | |
| 6,392,388 B1 | 5/2002 | Young | |
| 2005/0064278 A1 | 3/2005 | Fetcenko et al. | |

FOREIGN PATENT DOCUMENTS

JP 2004-63397 A 2/2004

OTHER PUBLICATIONS

C.J. Fraser, "Electrical and Electronic Principles," in D. Koshal (ed.), Manufacturing Engineers Reference Book, pp. 10-28 to 10-29, Butterworth-Heinemann: Oxford, Oct. 1993.*
Mack, Demystifying Switching Power Supplies, p. 208, Newnes: Oxford, Apr. 2005.*

* cited by examiner

*Primary Examiner* — Emily Le
*Assistant Examiner* — Michael Forrest
(74) *Attorney, Agent, or Firm* — Muncy, Gessler, Olds & Lowe, PLLC

(57) ABSTRACT

The present invention relates to a method of supplying electrical power to an equipment by means of a battery, said method including the step of short-circuiting the battery until it has a temperature greater than a predetermined threshold, characterized in that the battery is short-circuited with a temporal duty ratio determined to keep the equipment functioning and to maintain the temperature of the battery above the predetermined threshold. The invention also relates to a battery and an electrical equipment for implementing that method.

8 Claims, 2 Drawing Sheets

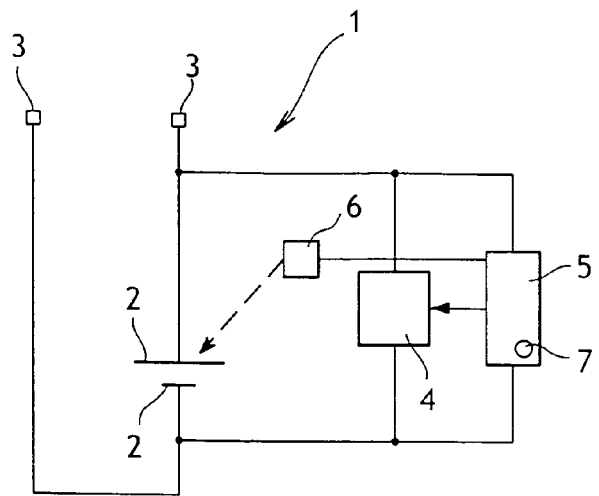
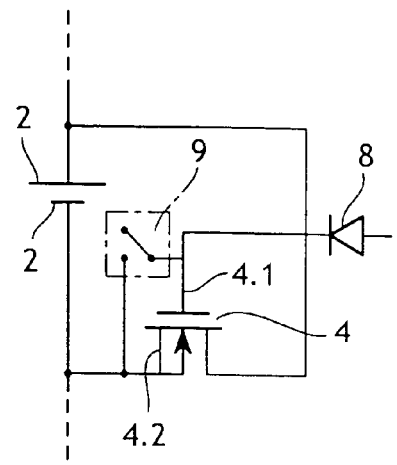
FIG.1    FIG.2
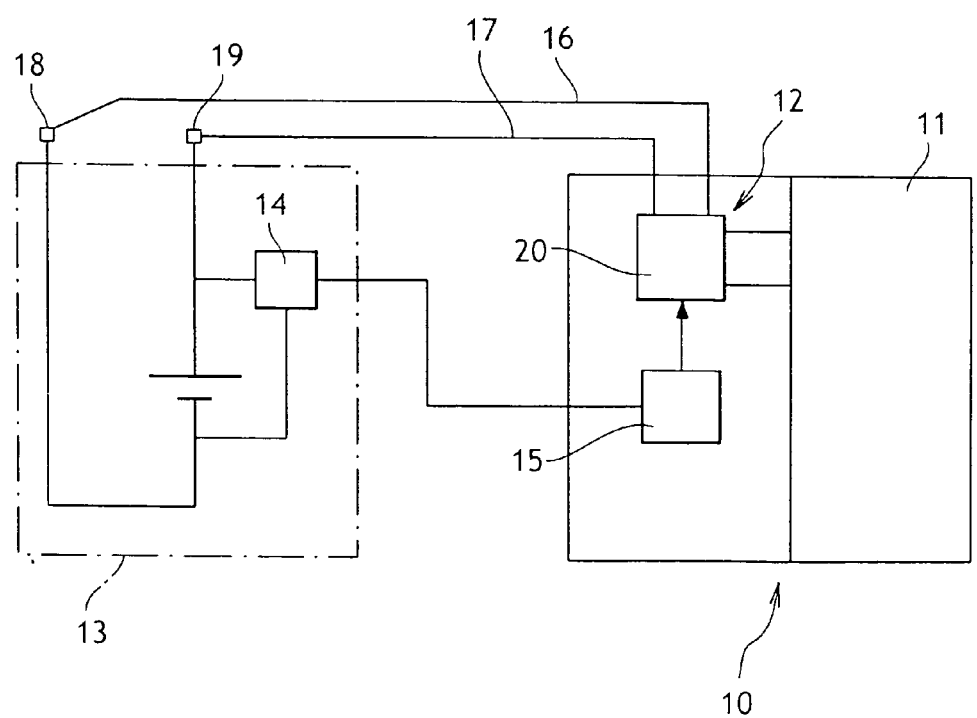
FIG.3

BATTERY, ELECTRICAL EQUIPMENT, AND A POWERING METHOD IMPLEMENTING MEANS FOR SHORT-CIRCUITING THE BATTERY

The present invention relates to a battery such as a lithium-ion (Li-ion) battery, to battery-powered electrical equipment, and to a method of supplying electrical power by means of a battery that are usable, in particular, in the field of portable electrical appliances.

BACKGROUND OF THE INVENTION

It is known that a battery has internal resistance, and that the lower its temperature, the higher its internal resistance. Such an increase in internal resistance reduces the performance of the battery to the point that said battery can no longer deliver sufficient power to the equipment to which it is connected.

In order to remedy that drawback, it has been imagined to associate the battery with an external heater device, e.g. including reagents which, when associated with one another, generate an exothermal reaction in the vicinity of the battery. Unfortunately, such a device would be relatively heavy and would require firstly a quantity of reagents that is sufficient for heating up the battery to be available, and secondly those reagents to be replaced once they are used up. That results in logistics constraints that are prohibitive for certain applications, in particular in places to which access is difficult.

It has also been imagined to surround the case of the battery with a resistor and to cause the battery to discharge into the resistor in order to heat the battery. The battery-and-resistance assembly would then have to be insulated thermally in order to obtain effective heating. Unfortunately, that would increase the volume and the weight of the battery and would be relatively costly while also offering relatively low efficiency, and the core temperature of the cells would rise slowly.

OBJECT OF THE INVENTION

It would thus be advantageous to have means for improving the performance of a battery at low temperatures.

SUMMARY OF THE INVENTION

To this end, the invention provides a method of supplying electrical power by means of a battery, said method including the step of short-circuiting the battery until it has a temperature greater than a predetermined threshold, the battery being short-circuited with a temporal duty ratio determined to keep the equipment functioning and to maintain the temperature of the battery above the predetermined threshold.

Short-circuiting the battery causes a sudden increase in temperature inside said battery itself. The heating procured is particularly effective because it acts at the core of the battery, and only gives rise to energy consumption that is relatively low and allows the battery to continue to supply the equipment.

The invention also provides a battery including a short-circuiting member arranged to be suitable for being controlled with a temporal duty ratio to go between a normal operating state in which the battery operates normally, and a short-circuiting state in which the battery is short-circuited, the shorting-circuiting member being connected to a temperature detector for detecting the temperature of the battery, so as to go over from the short-circuiting state to the normal operating state at a battery temperature that is greater than a predetermined threshold.

Thus, the battery incorporates heater means in the form of means for short-circuiting it.

The invention also provides electrical equipment including a power supply circuit having connection elements for connection to terminals of at least one battery and a switch member disposed between the connection elements and arranged to be suitable for being controlled with a temporal duty ratio to go between a shorting-circuiting state in which it connects the connection elements to each other, and a disconnection state in which it disconnects the connection elements from each other, the switch member being connected to a temperature detector for detecting the temperature of the battery, so as to go over from the short-circuiting state to the disconnection state at a battery temperature that is greater a predetermined threshold.

The equipment then incorporates the means making it possible to short-circuit the battery for the purpose of heating said battery up.

Other characteristics and advantages of the invention will appear on reading the following description of a particular non-limiting embodiment of the invention.

BRIEF DESCRIPTION OF THE DRAWING

Reference is made below to the accompanying drawing, in which:

FIG. 1 is a diagrammatic view of a battery of the invention;

FIG. 2 is a fragmentary diagrammatic view of a variant embodiment of said battery; and FIG. 3 is a diagrammatic view of electrical equipment of the invention.

DETAILED DESCRIPTION OF THE INVENTION

Figure 4:
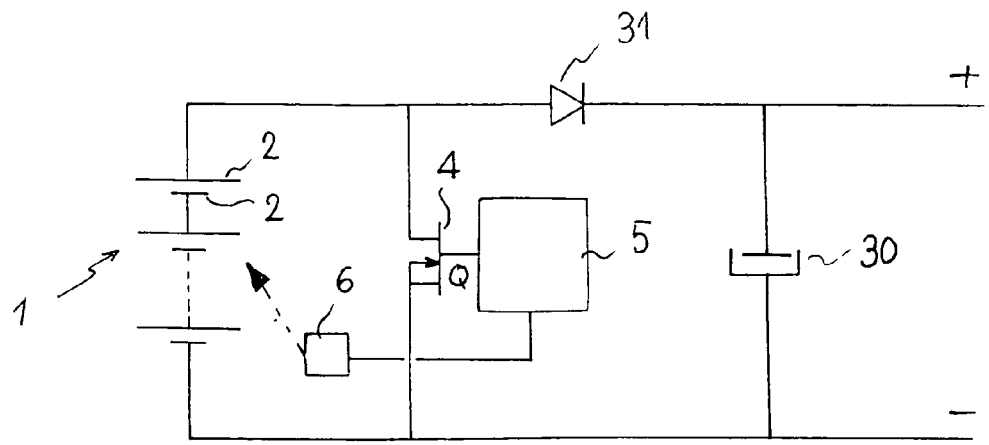
FIGS. 4 and 5 are views analogous to that one of FIG. 1, representing two other embodiments.

With reference to FIG. 1, the battery of the invention, designated by overall reference 1, is, in this example, an Li-ion battery, and, in a manner known per se, it comprises a series of electrodes 2 (only two electrodes are shown in FIG. 1) separated by an electrolyte and connected to connection terminals 3 that are external to the battery 1.

In accordance with the invention, the battery 1 is provided with a short-circuiting member 4 connected to the electrodes 2 and with a control circuit 5 that is itself connected to a temperature detector 6 for detecting the temperature of the battery 1.

The short-circuiting member 4 is, for example, a transistor of the Metal Oxide Semiconductor Field Effect Transistor (MOSFET) type that has a normal operating state in which the battery 1 operates normally and in which the short-circuiting member 4 maintains the electrodes 2 disconnected from each other, and a short-circuiting state in which the short-circuiting member 4 connects the electrodes 2 to each other for short-circuiting the battery 1.

The temperature detector 6 is a thermistor in this example.

The control circuit 5 is arranged to cause the short-circuiting member 4 to go from the short-circuiting state to the normal operating state when the temperature of the battery 1 as sensed by the temperature detector 6 is greater than a predetermined threshold. Said threshold is determined so that there is no risk of the temperature reached by the battery 1 as short-circuited giving rise to degradation of the battery 1. The control circuit 5 includes a member 7 enabling it to be electrically powered while the battery 1 is in the short-circuited state. In this example, the member 7 is a non-rechargeable additional battery.

For example, the battery 1 can be caused to be short-circuited automatically by the control circuit 5 when the temperature sensed by the temperature detector 6 is less than the predetermined threshold or, for example, by means of a switch disposed on the case of the battery 1 and accessible to the operator so that said operator can, as a function of the ambient temperature, manually cause the battery 1 to be heated up.

The battery can be short-circuited before or after said battery is connected to the equipment that it serves to power.

In the variant shown in FIG. 2, the control circuit (not shown) is analogous to the above-described circuit, and, similarly, the short-circuiting member 4 is a transistor of the MOSFET type whose gate 4.1 is connected to the control circuit 5 via a diode 8 for the purpose of causing the short-circuiting member to go from its normal operating state to its short-circuiting state.

The temperature detector 9 is a temperature-sensitive switch (or thermostat) connected to the gate 4.1 and to the source 4.2 of the short-circuiting member 4 that is arranged to short-circuit the gate-source junction when the internal temperature of the battery 1 exceeds the predetermined threshold. When the temperature detector 9 short-circuits the gate 4.1 and the source 4.2 of the short-circuiting member 4, said short-circuiting member then returns to its normal operating state. When the internal temperature descends below the predetermined threshold, the temperature detector 9 interrupts the previously-established connection between the gate and the source.

In this variant, it is not necessary for the control circuit 5 to have a power supply member 7 that is dedicated to powering it when the battery 1 is in the short-circuited state. It should also be noted that the temperature detector 9 prevents the battery 1 from being short-circuited accidentally if the internal temperature thereof is greater than the predetermined threshold.

As shown in FIG. 3, the equipment of the invention, designated by overall reference 10, includes an electrical unit 11 connected via a power supply circuit 12 to a battery 13.

In this example, the battery 13 is an Li-ion battery of the smart type, i.e. of the type complying with the specifications of the Smart Battery Systems (SBS) industrial standard, incorporating a processor 14 suitable for delivering information relating to various characteristics of the battery and, in particular, to its charge level and to its internal temperature.

The power supply circuit 12 itself includes a processor represented diagrammatically at 15 and connected to the processor 14 via connection means that are known per se, and that are not shown in FIG. 2, so that the processor 14 can transmit to the processor 15 a signal representative of the internal temperature of the battery 1. The power supply circuit 12 further includes conductors 16, 17 connected to terminals 18, 19 of the battery 13. A switch member 20 is disposed between the conductors 16, 17, and it can be actuated to go between a short-circuiting state in which it connects said conductors 16, 17 to each other, and a disconnection state in which it disconnects said conductors 16, 17 from each other. The power supply circuit includes a non-rechargeable battery (not shown in the figure), for powering it when the battery is in the short-circuited state.

The processor 15 of the power supply circuit 12 is connected to the switch member 20 for controlling the switch member 20 so as to cause it to go from the short-circuiting state to the disconnection state when the temperature is greater than a predetermined threshold. For example, the battery can be caused to be short-circuited automatically by the processor 15 when the temperature signal transmitted by the processor 14 is less than the predetermined threshold or, for example, by means of a switch disposed on the case of the battery 1 and accessible to the operator so that said operator can, as a function of the ambient temperature, manually cause the battery 1 to be heated up.

Naturally, the invention is not limited to the embodiment described, and it is possible to implement variant embodiments without going beyond the ambit of the invention as defined by the claims.

In particular, the short-circuiting can be achieved by means of a dedicated circuit connected to the battery and to the equipment to be powered.

The short-circuiting member 1 can be provided with a passive safety element, such as a thermo-fuse or a temperature-sensitive switch, interrupting the short-circuiting of the battery as soon as the temperature exceeds the predetermined threshold in the event that the control circuit fails. The short-circuiting member can differ from the short-circuiting member described, and, for example, be constituted by any type of power switch that can be switched both on and off (bipolar transistor, Insulated Gate Bipolar Transistor (IGBT), or thyristor that can be switched off).

In addition the member 7 making it possible to power the control circuit 5 when the battery is in the short-circuited state (first embodiment) can be a rechargeable additional battery that is connected to the electrodes 2 so as to be recharged by the battery 1. The additional battery is then connected to the electrodes 2 via a diode so that, when the battery 1 is in the short-circuited state, the diode does not conduct, thereby preventing the additional battery from being short-circuited, and so that, when the battery 1 is not in the short-circuited state, the diode conducts, thereby enabling the battery 1 to recharge the additional battery.

The member 7 can also be a capacitor dimensioned so as to power the control circuit 5 when the battery 1 is in the short-circuited state. If the capacitor is under-dimensioned and is not sufficient to power the circuit for the entire period of the short-circuit, it is possible to make provision for the battery to be short-circuited in successive stages so that the capacitor can be recharged between short-circuiting stages. In which case the shorting-circuiting stages and the opening stages can succeed one another at a frequency that can be in the range relatively slow (substantially less than one hertz) to fast (a few megahertz) for the purpose of minimizing the capacitance of the additional capacitor (the frequency being limited only by the performance of the power components used).

It is also possible to heat up the battery or to sustain the temperature of the battery while the powered equipment is in normal use. In very cold conditions, there is a risk that the energy dissipated in the battery (equal to the product of the internal resistance of the battery multiplied by the square of the current consumed by the equipment) might be too small to sustain the temperature of the battery. In which case, the voltage drop (which is equal to the product of the internal resistance multiplied by the consumed current) becomes too large to allow the equipment to operate. It then becomes necessary to heat up the battery, but short-circuiting the battery makes it necessary to interrupt operation of the equipment if no other power source is available. In this variant, the short-circuit is applied with a duty cycle or duty ratio, here of relatively high-frequency. A power diode is then provided between the battery and the equipment so as to enable the input capacitor of the equipment to preserve the voltage of the battery throughout the duration of the periodic short-circuiting.

FIG. 4 represents a circuit according to that embodiment. That circuit connects the electrodes 2 of a battery 1 to an equipment not shown. A short-circuiting member 4 in the form of MOSFET type transistor is connected to the electrode 2 and to a control circuit 5 itself connected to a temperature detector 6 for detecting the temperature of the battery 1. Between the electrodes 2 is also mounted an input capacitor 30 of the equipment and a power diode 31 mounted between the battery 1 and the capacitor 30.

The control circuit 5 compares the temperature detected by the detector 6 and the temperature threshold from which heating of the battery is not necessary, and elaborates a signal Q making conductive the short-circuiting member 4 with a duty ratio depending with the difference between the detected temperature and a set-point temperature (equal to the temperature threshold). When the detected temperature is equal to the set-point temperature, the duty ratio is equal to zero whereas, when the detected temperature is far below the set-point temperature, the duty ratio is equal to 1. The capacitance of the capacitor 31 is determined in such a way that the voltage at the capacitor terminals do not notably lower during the short-circuit of the battery.

The power diode 31 can advantageously be replaced with a MOSFET transistor controlled using the "synchronous rectification" method so as to overcome the problem of the voltage drop across the diode and, thus, so as to improve efficiency.

Figure 5:
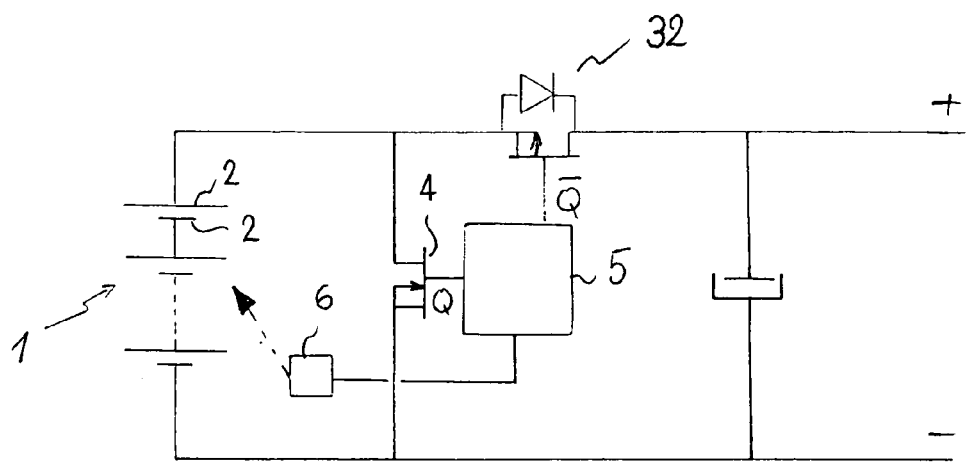

That embodiment is shown at FIG. 5 wherein the diode 31 of the preceding embodiment has been replaced by a transistor 32 of the MOSFET type connected to the control circuit 5 to be controlled by that circuit. It will be noticed that the transistor 32 is positioned in such a manner that its internal diode is oriented in the same way as the diode 31 of the preceding embodiment, i.e. conductive to allow the battery 1 to supply the equipment.

The working of the supplying circuit is the same as in the preceding embodiment. The transistor internal diode is short-circuited by the field effect to save on the voltage drop in the diode.

The control circuit 5 has two outputs Q and $\overline{Q}$ such that, when the short-circuiting member 4 is conductive, the transistor 32 is blocked and vice versa.

The calculation of the duty ratio is explained hereafter.
The equipment functions when $$FEM - V_{min.eq} > R_B \times I_{eq} \text{ i.e } R_B < \frac{FEM - V_{min.eq}}{I_{eq}} \quad (1)$$

FEM is the off-load voltage of the battery,
$R_B$ is the internal resistance of the battery in a heated-up state,
$V_{min.eq}$ is the minimal tension permitting a working of the equipment,
$T_{eq}$ is the current drained by the equipment.
The internal resistance of the battery depends with:
the battery structure,
the use made of the battery (the internal resistance increases with the number of charge-discharge cycles applied to the battery),
the temperature (higher is the temperature, lower is the resistance).
When the internal resistance is too high, the battery can not supply the equipment. One remedy is to increase the temperature of the battery up to a temperature at which the internal resistance is sufficiently low to permit a supplying of the equipment.

The working condition becomes $$P_B > \frac{\Delta t}{R_{thB}} \quad (2)$$

where $P_B$ is the power dissipated in the battery i.e. $R_b \times I_{eq}^2$, $\Delta t$ is the difference between an initial temperature of the battery and the temperature allowing the equipment supplying, $R_{thB}$ is the thermal resistance of the battery at ambient temperature (totals the thermal losses in the battery, ° C./W).

To maintain that working condition, the battery is short-circuited with a duty ratio $$\tau = \frac{T_{cc}}{T}$$

where T is the period and $T_{cc}$ is the short-circuit duration during each period.

During $T_{cc}$, the battery does not supply any current. During $T-T_{cc}$, the battery supplies the current $I_{eq}$.

The condition (2) becomes $$P_m > \frac{\Delta t}{R_{thB}} \quad (3)$$

where $P_m$ is the average power dissipated in the battery during the short-circuit and during the equipment supplying i.e.

$$Pm = \tau \times P_{cc} + (1-\tau) P_{Ieq} \quad (4)$$

with $$P_{cc} = \frac{FEM^2}{R_B}$$

Furthermore the duty ratio is such that $$\tau \times P_{cc} + (1-\tau) P_{Ieq} = \frac{\Delta t}{R_{thB}} \quad (5)$$

By way of example, assuming that the equipment and the battery have the following features: $V_{min.eq}$=3 V $I_{eq}$=1 A; FEM=3.7 V; RB=0.5Ω; $R_{thB}$=10° C./w. The equipment operates when the temperature of the battery is at least in the vicinity of the temperature corresponding to the heated-up state. When it is cold (considering 20° C. below the temperature corresponding to the heated-up state i.e. $\Delta t$=20), the battery needs internal dissipation of 2 watts in order to remain in the heated-up state ($\Delta t/R_{thB}$). Unfortunately, the power consumption of the equipment induces dissipation of only 0.5 watts in the battery ($P_B=P_{Ieq}=R_B \times I_{eq}^2$). The battery thus cools and its internal resistance increases. The equipment switches off when the voltage has decreased to below 3 volts. It is possible to wait for the equipment to switch off before short-circuiting the battery, the power given off inside the battery is then 26 watts, i.e. thirteen times more than is necessary to sustain the temperature of the battery. It is then also possible to apply the short-circuit with a duty ratio of $1/13^{th}$ (i.e. 7.7%), in order to dissipate 2 watts inside the battery and to keep the equipment in operation continuously (for reasons of simplicity, the heat dissipation generated by the current consumed by the equipment is not taken into account, the short-circuit duty ratio in fact being slightly less than $1/13^{th}$). The battery is short-circuited $1/13^{th}$ of the time and powers the equipment $12/13^{ths}$ of the time. For a chopper frequency of about 300 kilohertz (kHz), the period is 3.3 microseconds and the time for which the equipment is not powered is 0.26 microseconds. A capacitor of relatively low capacitance can power the equipment for that time and can be recharged for the remaining $12/13^{ths}$ of the time. More precisely, taking into account the above-mentioned heat dissipation and thus applying formula (5), we obtain a duty ratio of 5.6%. It is therefore sufficient to apply the short-circuit with that duty ratio in order to make the battery able to supply the equipment.

It is possible to control the power switch(es) by using a control circuit according to a set-point representative of the temperature threshold. Is among others usable a Pulse Width Modulation (PWM) integrated circuit conventionally including a voltage reference, an operational amplifier, a sawtooth generator, and a comparator for comparing the error signal of the operation amplifier with the sawtooth voltage. The output from said comparator is the instruction for causing the short-circuiting transistor to conduct. By converting the temperature of the battery (e.g. measured by means of a thermistor or by means of a thermocouple) into a voltage, the PWM circuit can adjust the short-circuit duty ratio so as always to obtain the desired battery temperature. By means of its high-gain servo-control loop, said circuit causes continuous short-circuiting so long as the battery temperature has not reached the setpoint value set for the servo-control. When the equipment is switched on when cold, the above-described apparatus itself establishes a continuous short-circuit without powering the equipment and goes over to the duty ratio that corresponds to thermal equilibrium in order to cause the equipment-powering voltage to appear. The PWM circuit can be replaced with any other control circuit, and in particular with a "soft" switching control circuit, or a quasi-resonant or resonant circuit, or a circuit having phase variation or frequency variation or a combination of phase variation, of frequency variation and of duty ratio variation. The control circuits can be analog or digital. The power diode and the capacitor that are used above can be replaced by some other means for temporarily storing energy such as an induction coil associated with a power switch. It is also possible to use the power induction coil that is generally present in the power converter or the power regulator of the equipment when said equipment includes such a converter or such a regulator.

When the battery 1 comprises a plurality of storage cells in series or in parallel, the control and short-circuiting circuit can be arranged to short-circuit some of said cells and to be powered by one or more of the other cells.

In equipment that includes at least two batteries to which an appliance is connected that includes a power supply circuit, the power supply circuit can be powered by one of the batteries (in view of its low consumption) while it short-circuits the other battery. Once said other battery has been heated up, the power supply circuit connects said other battery to those components which consume large amounts of electricity.

What is claimed is:

1. A method of supplying electrical power to an equipment by means of a battery (1, 13), said method including the step of short-circuiting the battery until it has a temperature greater than a predetermined threshold, characterized in that the battery is short-circuited with a temporal duty ratio determined to keep the equipment functioning and to maintain the temperature of the battery above the predetermined threshold, the duty ratio $\tau$ being: $\tau \times P_{CC} + (1-\tau) P_{leq} = \Delta t / R_{thB}$ wherein $\tau$ is the duty ratio, $P_{CC}$ is the power dissipated in the battery when short-circuited, $P_{leq}$ is the power dissipated in the battery when supplying the equipment, $\Delta t$ is the temperature raising necessitated to allow the battery to supply the equipment and $R_{thB}$ is the resistance of the battery.

2. Electrical equipment for implementing the method of claim 1, including a power supply circuit having connection elements for connection to terminals of at least one battery and a switch member disposed between the connection elements and arranged to be suitable for being controlled with a duty ratio to go between a shorting-circuiting state in which it connects the connection elements to each other, and a disconnection state in which it disconnects the connection elements from each other, the switch member being connected to a temperature detector for detecting the temperature of the battery, so as to go over from the short-circuiting state to the disconnection state at a battery temperature that is greater a predetermined threshold.

3. Electrical equipment according to claim 1, wherein the power supply circuit comprises an input capacitor.

4. Electrical equipment according to claim 3, wherein a power diode is mounted between the battery and the input capacitor.

5. Electrical equipment according to claim 3, wherein a MOSFET transistor is mounted between the battery and the input capacitor and is controlled using a "synchronous rectification" method to constitute the switch member.

6. Electrical equipment according to claim 2, wherein the switch member is connected to a control circuit for controlling the switch member according to a set-point representative of the temperature threshold.

7. Electrical equipment according to claim 6, wherein the control circuit is a pulse-width-modulation circuit having an output constituting a conduction command for the switch member.

8. A battery for implementing the method of claim 1, characterized in that it includes a short-circuiting member arranged to be suitable for being controlled with a duty ratio to go between a normal operating state in which the battery operates normally, and a short-circuiting state in which the battery is short-circuited, the shorting-circuiting member being connected to a temperature detector for detecting the temperature of the battery, so as to go over from the short-circuiting state to the normal operating state at a battery temperature that is greater than a predetermined threshold.

* * * * *